(No Model.)
D. JONES & C. TEST.
FILTER.
No. 524,827. Patented Aug. 21, 1894.
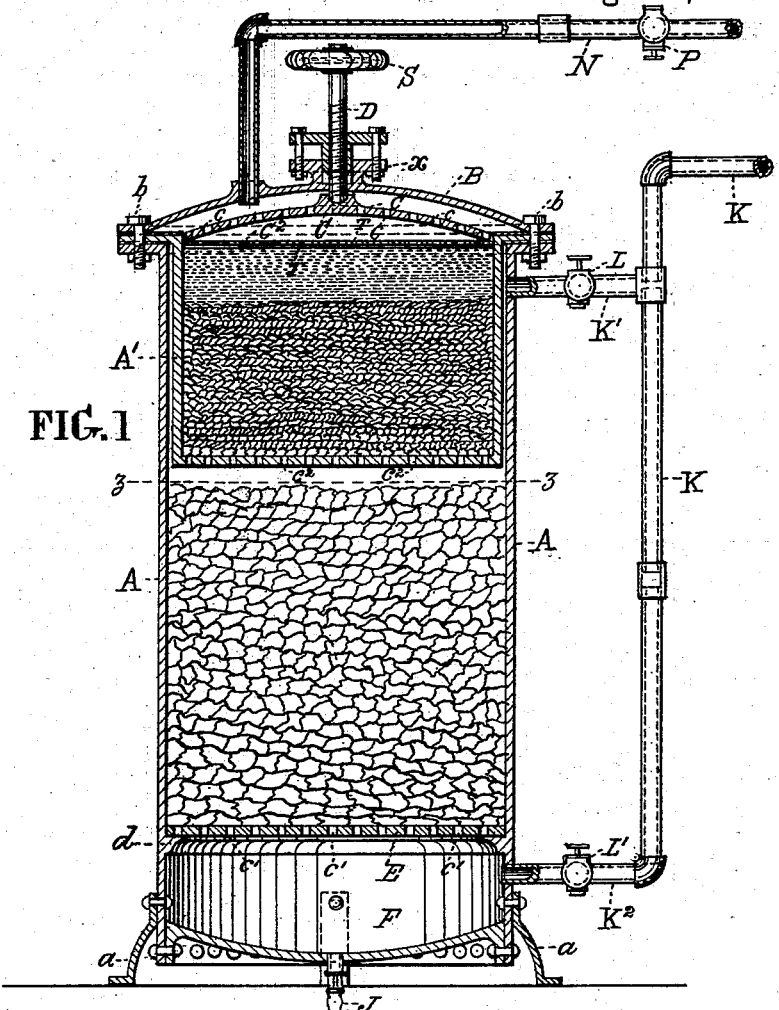
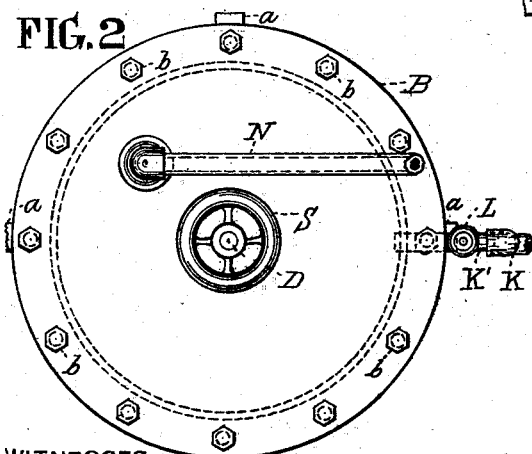
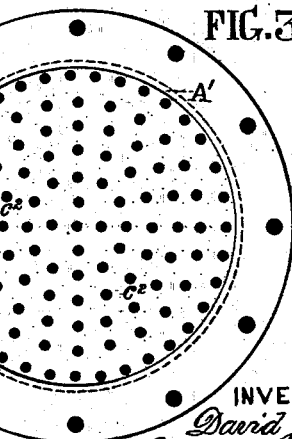

UNITED STATES PATENT OFFICE.

DAVID JONES, OF PHILADELPHIA, PENNSYLVANIA, AND CLAYTON TEST, OF CAMDEN, NEW JERSEY.

FILTER.

SPECIFICATION forming part of Letters Patent No. 524,827, dated August 21, 1894.

Application filed March 22, 1894. Serial No. 504,595. (No model.)

*To all whom it may concern:*

Be it known that we, DAVID JONES, residing at Philadelphia, in the county of Philadelphia and State of Pennsylvania, and CLAYTON TEST, residing at Camden, in the county of Camden and State of New Jersey, citizens of the United States, have invented certain new and useful Improvements in Filters, of which the following is a specification.

The invention relates to an improvement in filters, for defecating water, and other liquids, in which a metallic incasing chamber is combined with an inclosed chamber composed of porous material, each chamber being filled with charcoal, gravel, or other material suitable for the retention and absorption of impure and foreign matter from the liquid; with a muslin cloth, a perforated plate and a cover to retain the purifying medium in place and the chambers also provided with suitable inlet and outlet passages for the conveyance to and from the filter of the stream, or column of liquid, and means for withdrawal of same when defecated. A mud pan, is also provided in the base of the external, or main chamber, to which is connected a faucet, whereby the precipitated mass of impurities deposited therein, may be withdrawn, when the current of liquid, passing through the filter is reversed in its action, for the purpose of washing the filtering medium.

The construction and operation of the filter will be more fully understood from the following detailed description, and accompanying sheet of drawings, in which—

Figure 1, is a vertical section of the improved filter, and its connections. Fig. 2, is a plan view of same. Fig. 3, is a plan, or top view of the porous chamber, A', detached from the filter.

Like letters of reference in all the figures indicate the same parts.

A, is the external metallic casing, or main chamber of the filter, provided with a series of feet $a$, which serve as supports to maintain the filter in its vertical position. This chamber, or casing has situated within it, at the upper end, the supplemental chamber A', composed of porous substance, having an outwardly projecting flange at its upper end whereby it is caused to rest upon a corresponding flange of the casing A, and is bolted thereon. It is externally of slightly smaller diameter than the incasing wall surrounding it, so as to allow of any water, or liquid permeating its wall, to drop back into the chamber A. It is also provided with a series of perforations, or orifices $c'$, extending through the substance of its bottom, to permit of the flow through the chamber of the current of liquid.

B, is the lid, or cover, provided with a stuffing box $x$, centrally arranged externally upon its top; and is provided with a flange upon its circumference, having orifices vertically through it, by means of which it is secured to the casing A, by the bolts $b$. A metallic, or gum gasket is interposed between the adjacent surfaces of the external, and porous chambers, and the cover, to prevent escape of liquid, at the jointure.

C, is a circular metallic disk, of slightly convex form, externally, having a series of vertical perforations $c$, through it, which is of equivalent diameter to the superficial area of the supplemental chamber A', and which is held down firmly on the mass of filtering material in said chamber by means of the screw rod D, which passes through the stuffing box E, the lower end of the rod being seated in a central depression upon the surface of the disk C.

$C^2$ is a perforated metallic plate, below, the plate C.

T is a muslin cloth.

E, is the removable bottom of the external casing A, having a series of vertical perforations $c'$ through it, which is seated on the annular rim $d$, projected laterally from the inner vertical surface of chamber A.

F, is the mud pan, or sediment receptacle situated in the lower, or base portion of the incasing chamber A, and is provided in its bottom with a blow-off cock J, for the exit of the deposit of extraneous matter, which is deposited in said pan during the process of filtration.

K, is the inlet pipe for conveying the supply of water to the filter for the purpose of defecation. It has connection with the filter and mud pan, respectively by means of the lateral branch pipes K', $K^2$, the flow of liquid being capable of regulation and control by means of the valves L, L', which are opened or closed in accordance with the direction desired in which to direct the volume of liquid through the filter.

N, is the outlet pipe, for the exit of the stream of purified liquid, after its passage through the filter in the defecating process. The exit is controlled by means of the valve, or faucet P.

The method of operation of the filter, is as follows: The interior of the external, or main metallic casing A, is first charged, with a mass, or assemblage of coarsely broken lump charcoal; gravel stone, or analogous substance, up to the point represented by the dotted line $z$, in Fig. 1. Then the supplemental porous chamber A', is placed in position within the upper end of said chamber A, and filled with a similar filtering medium substance as the lower chamber; (but composed of more finely disintegrated particles than that contained in the main chamber) and its surface coated with a like substance finely pulverized. A cloth of muslin, or flannel T is laid on; and upon that the perforated metallic plate $C^2$. Then the muslin, or cotton cloth T, is laid upon the mass of filtering material, and thereon the perforated cover C, with the lid B, and the customary annular gaskets interposing between the adjacent, or contiguous flanges, and the parts securely united by means of the series of screw bolts and nuts $b$, which pass through orifices in the flanges fitted for their reception. The perforated cover C, and the cotton cloth T, are then brought down upon the perforated plate $C^2$, and muslin cloth on the surface of the filtering substance by the rotation of the hand wheel S, which causes the descent of the screw rod D, which has a threaded connection within the gland of the stuffing box $x$, to force the perforated cover down upon the assemblage of filtering substance in the supplemental chamber A', and retain same in position, by reason of the lower end of said rod resting and bearing within a depression in the upper surface of the cover C; thus binding the assemblage of filtering medium in the upper, or supplemental chamber A', and preventing its dislodgment by the force of the current of liquid passed through the filter. The filter now being ready for action: the column of water to be filtered (the supply being drawn from a reservoir, or main pipe leading from a pumping station, not necessary to show in the drawings) is permitted to enter the bottom of the filter into the lower chamber, or mud pan F, from the inlet supply pipe K, the upper valve L, in the branch pipe K', being closed, and valve L', in the lower branch pipe $K^2$, being open, from whence the body of water, or liquid flows upward through the perforations $c'$, in the removable bottom E, into the main chamber A, continuing its course upward through the assemblage of filtering material, it passes through the perforations $c^2$, in bottom, into the supplemental chamber A', continuing its upward course through the filtering medium contained therein, to and through cloth and perforated plate, from thence through the orifices $c$, in the cover C, upon the surface of the filtering medium, contained in this latter chamber, to exit, or withdrawal pipe N, in the lid, or cap plate B, the outlet of the liquid, when defecated, being controlled by the valve, or faucet P, in said pipe N. The passage, or flow of the current of liquid upward from the base, or lower chamber, i. e., the mud pan, and the interposed plates, and chambers containing filtering medium, effectually remove the particles of extraneous and foreign matter contained in the liquid, by reason of their affinity to the filtering material, thus rendering the liquid at the source of outlet pure and free from contamination.

To cleanse the assemblages of filtering material, from impure matter deposited thereon, during the flow of the current of water upward to the exit pipe, the action of the current is changed in its course, by the reversal of the action of the current of liquid through the inlet pipe: which is effected by closing the valve L' in the lower branch pipe $K^2$, and opening the valve L, in the upper branch pipe K': when by breaking connection of the inlet pipe K, with the source of supply, and substituting in lieu of the liquid, a current of steam, passing into the upper chamber A, the sediment lodging and cohering in the chambers, and filtering media, is driven downward into the mud pan F, from whence it is permitted exit by means of opening the valve, or faucet J, in the usual method employed in the expulsion of sediment from steam boilers.

We claim as our invention and desire to secure by Letters Patent—

The filter, for defecating liquids, herein shown and described, consisting of the chamber A, having a perforated removable bottom E, and a mud pan, or sediment receptacle in its lower end, or base, provided with a draw-off valve, or faucet J, in its bottom plate in combination with the supplemental chamber A', constructed of porous material, with a series of vertical perforations through its base: the perforated plate $C^2$, muslin cloth T, and the perforated cover C, for compressing and confining the filtering material in position, the lid B, bolted to the chambers A, A', said filter being provided with the inlet pipe K, having branch pipes K', $K^2$, entering respectively the upper part of the chamber A, and the sediment chamber, F, fitted with the valves L, L'; and the outlet pipe N, fitted with the faucet P, in combination with the packing of porous filtering material, substantially in the manner herein shown and described, for the purpose specified.

DAVID JONES.
CLAYTON TEST.

Witnesses:
THOMAS J. BEWLEY,
JOHN F. GRANT.